United States Patent
Abou Mahmoud et al.

(10) Patent No.: US 10,636,017 B2
(45) Date of Patent: *Apr. 28, 2020

(54) CHARGE MANAGEMENT

(71) Applicant: International Business Machines Corporation, Armonk, NY (US)

(72) Inventors: Alaa Abou Mahmoud, Dracut, MA (US); Paul R. Bastide, Ashland, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/445,295

(22) Filed: Jun. 19, 2019

(65) Prior Publication Data
US 2019/0303885 A1 Oct. 3, 2019

Related U.S. Application Data

(63) Continuation of application No. 16/423,347, filed on May 28, 2019, which is a continuation of application No. 15/401,023, filed on Jan. 7, 2017, now Pat. No. 10,346,812.

(51) Int. Cl.
*G06Q 10/00* (2012.01)
*G06Q 10/06* (2012.01)

(52) U.S. Cl.
CPC ........ *G06Q 10/20* (2013.01); *G06Q 10/0631* (2013.01)

(58) Field of Classification Search
CPC .......................... G06Q 10/0631; G06Q 10/20
See application file for complete search history.

(56) References Cited

U.S. PATENT DOCUMENTS

| | | | |
|---|---|---|---|
| 8,054,192 B2 | 11/2011 | Grigsby et al. | |
| 8,560,236 B1 | 10/2013 | Zahir | |
| 2003/0061072 A1* | 3/2003 | Baker | G06Q 30/02 705/3 |
| 2006/0135217 A1 | 6/2006 | Sung | |
| 2013/0162430 A1 | 6/2013 | Scherzer | |

(Continued)

OTHER PUBLICATIONS

IBM: List of IBM Patents or Patent Applications Treated As Related (Appendix P), Jul. 24, 2019, 2 pages.

(Continued)

*Primary Examiner* — Kyle R Quigley
(74) *Attorney, Agent, or Firm* — L. Jeffrey Kelly

(57) ABSTRACT

Disclosed aspects relate to charge management of a device. A first location-modification event of the device may be detected by a charge management engine. The first location-modification event of the device may indicate a first movement event of the device from an original location to a target location. A device charge pattern may be determined based on a set of profile data for a user. The device charge pattern may include a set of criteria that indicates to charge the device. Achievement of the set of criteria may be identified by the charge management engine based on the device charge pattern. Achievement of the set of criteria may relate to the first location-modification event. An indication to charge the device may be provided by the charge management engine. A charge may be received by the device.

18 Claims, 5 Drawing Sheets

(56) References Cited

U.S. PATENT DOCUMENTS

| | | |
|---|---|---|
| 2014/0082384 A1 | 3/2014 | De Cesare |
| 2014/0155100 A1 | 6/2014 | Baldasare |
| 2014/0257053 A1 | 9/2014 | Yuen |
| 2015/0084778 A1 | 3/2015 | Mittal |
| 2015/0123595 A1 | 5/2015 | Hussain |
| 2015/0198676 A1 | 7/2015 | Min |
| 2015/0288207 A1 | 10/2015 | Walker, Jr. |
| 2016/0012957 A1 | 1/2016 | Lim |
| 2016/0064955 A1 | 3/2016 | Zuerner |
| 2016/0064961 A1 | 3/2016 | Dicarlo |
| 2016/0072802 A1 | 3/2016 | Hoyos |
| 2016/0112775 A1 | 4/2016 | Kim |
| 2016/0141908 A1 | 5/2016 | Jakl |
| 2016/0150072 A1 | 5/2016 | Rangarajan |
| 2016/0338642 A1 | 11/2016 | Parara |
| 2016/0357654 A1 | 12/2016 | De La Cropte De Chantérac |
| 2018/0198307 A1 | 7/2018 | Abou Mahmoud |
| 2018/0198311 A1 | 7/2018 | Abou Mahmoud |

OTHER PUBLICATIONS

Banos et. al; "PhysioDriod: Combining Wearable Health Sensors and Mobile Devices for a Ubiquitous, Continuous, and Personal Monitoring"; Hindawi Publishing Corporation; Sep. 10, 2014.
Lane et. al; "ZOE: A Cloud-less Dialog-enabled Continuous Sensing Wearable Exploiting Heterogeneous Computation"; Bell Labs, University of Cambridge, Intel Research; 2015.
Pending U.S. Appl. No. 16/423,347, filed May 28, 2019, entitled: "Charge Management", 45 pages.

\* cited by examiner

CHARGE MANAGEMENT

BACKGROUND

This disclosure relates generally to computer systems and, more particularly, relates to charge management of a device. Battery-powered devices may need to be charged frequently. The amount of battery-powered devices used by society is increasing. As the amount of battery-powered devices used increases, the need for charge management of a device may also increase.

SUMMARY

Aspects of the disclosure relate to the management of battery life of a wearable device. Disclosed aspects may detect a location change of a device. Features may detect frequent patterns of activity, analyze patterns, and indicate to the user when to charge the device. Aspects of the disclosure may alert the user to charge the wearable device when the user is expected to remain in a location for a predetermined length of time. Features may present an alert to the user prior to this time in order to facilitate charging the wearable device.

Disclosed aspects relate to charge management of a device. A first location-modification event of the device may be detected by a charge management engine. The first location-modification event of the device may indicate a first movement event of the device from an original location to a target location. A device charge pattern may be determined based on a set of profile data for a user. The device charge pattern may include a set of criteria that indicates to charge the device. Achievement of the set of criteria may be identified by the charge management engine based on the device charge pattern. Achievement of the set of criteria may relate to the first location-modification event. An indication to charge the device may be provided by the charge management engine. A charge may be received by the device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
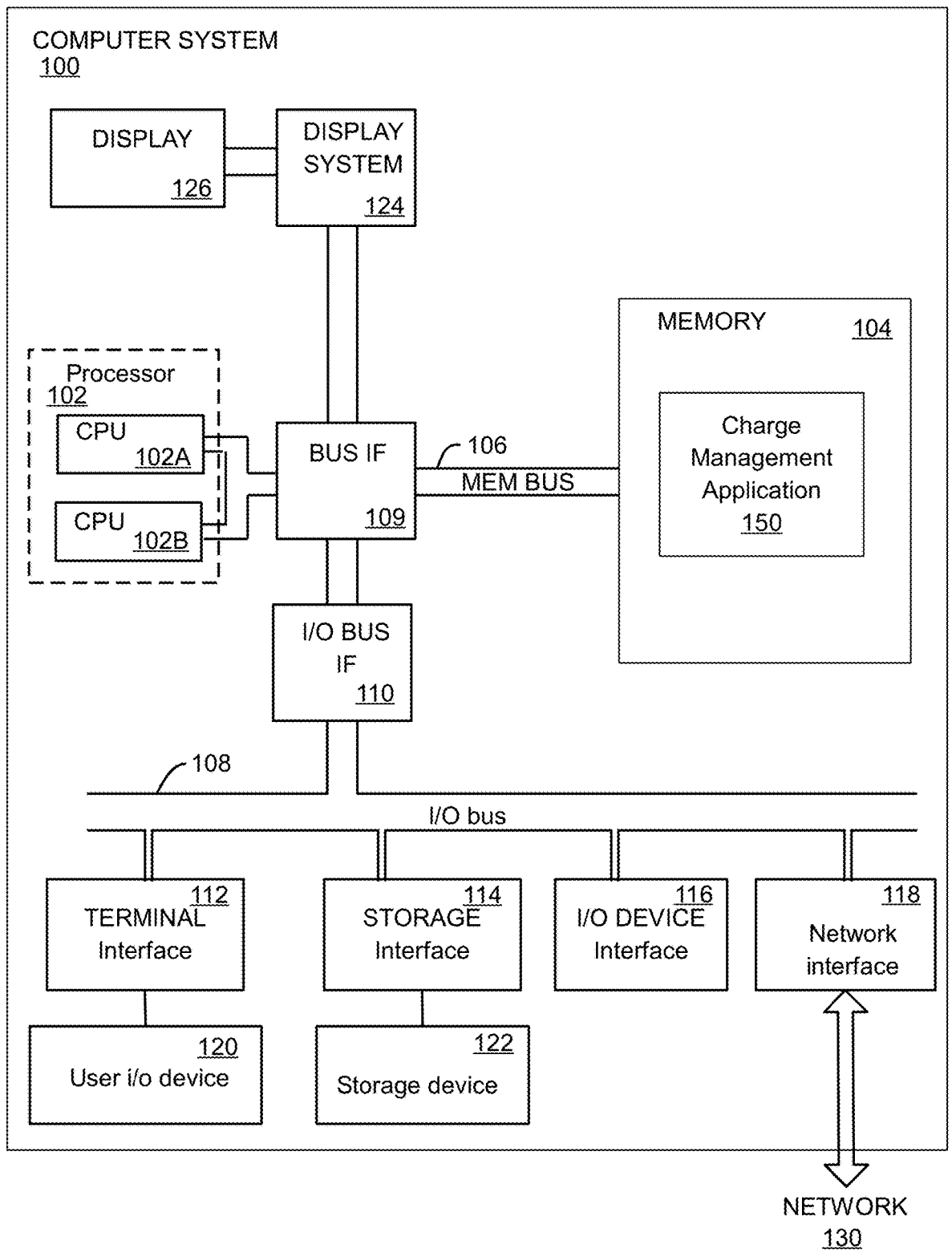
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to the management of battery life of a wearable device. Disclosed aspects may detect a location change of a device (e.g., using one or more global positioning system techniques). Features may detect frequent patterns of activity, analyze patterns, and indicate to the user when to charge the device. Aspects of the disclosure may alert the user to charge the wearable device when the user is expected to remain in a location for a predetermined length of time. Features may present an alert to the user prior to this time in order to facilitate charging the wearable device.

Personal health information and wearable technologies may be used to adjust patterns and lifestyles for improved health. Many individuals may use devices such as fitness bands, smartwatches, clothing, shoes, or other wearable devices to track and improve their health and wellness habits. As wearable devices are becoming more and more popular, the need to manage and optimize charge of wearable devices may become more important. The devices and included services may generate a continuous feed of information. The continuous feed may require power to record and transmit the data to the health service. For example, data transmitted may include whether or not the user is getting enough sleep, whether or not their heart rate is normal, or other types of physical wellness data. The continuous feed of information may be interrupted when the device needs recharging. The time of charging may vary for different devices, but may be as long as two hours a day. In order to collect an accurate set of data for the user of the wearable device, there may be a need to improve the continuous feed of information and therefore the charging pattern of the device.

For example, the wearable device of a user may gather pulse data, sleep data, data regarding number of steps, and other types of data. The user may input a goal for heart-rate measurement. The user may spend one hour driving to work in the morning. The wearable device can determine that the location of the user has changed from their apartment to their car using location-based services. The wearable may analyze patterns of frequent activity for this user and can determine that the user is not likely to move for the next hour-long period. The wearable device may retrieve health data and goals for the user. If the user is unlikely to move for an hour, there may be no significant heat-rate data to record. The wearable device may alert the user to charge the device during the hour spent in the car.

Aspects of the disclosure include a system, method, and computer program product for charge management of a device. A first location-modification event of the device may be detected by a charge management engine. The first location-modification event of the device may indicate a first movement event of the device from an original location to a target location. A device charge pattern may be determined based on a set of profile data for a user. The device charge pattern may include a set of criteria that indicates to charge the device. Achievement of the set of criteria may be identified by the charge management engine based on the device charge pattern. Achievement of the set of criteria may relate to the first location-modification event. An indication to charge the device may be provided by the charge management engine. A charge may be received by the device.

Aspects of the disclosure relate to determining a time during which the wearable device should be charged based on information gathered about the user. In embodiments, the wearable computing device may include both a location sensor and a biometric sensor. In various embodiments, a set of profile data for the user may be collected. In certain embodiments, the set of profile may include temporal data, biometric data, calendar data, user-provided input data, or other types of data. In embodiments, the set of profile data may be analyzed to determine the device charge pattern. For example, the indication to charge may correspond to an anticipated event or location. In certain embodiments, the set of profile data for the user may be derived from a set of data from a group of similar users or a set of individualized data based on the history of the user. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a charge management application 150. In embodiments, the charge management application 150 may include instructions or statements that execute on the processor 102 or instructions or statements that are interpreted by instructions or statements that execute on the processor 102 to carry out the functions as further described below. In certain embodiments, the charge management application 150 is implemented in hardware via semiconductor devices, chips, logical gates, circuits, circuit cards, and/or other physical hardware devices in lieu of, or in addition to, a processor-based system. In embodiments, the charge management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
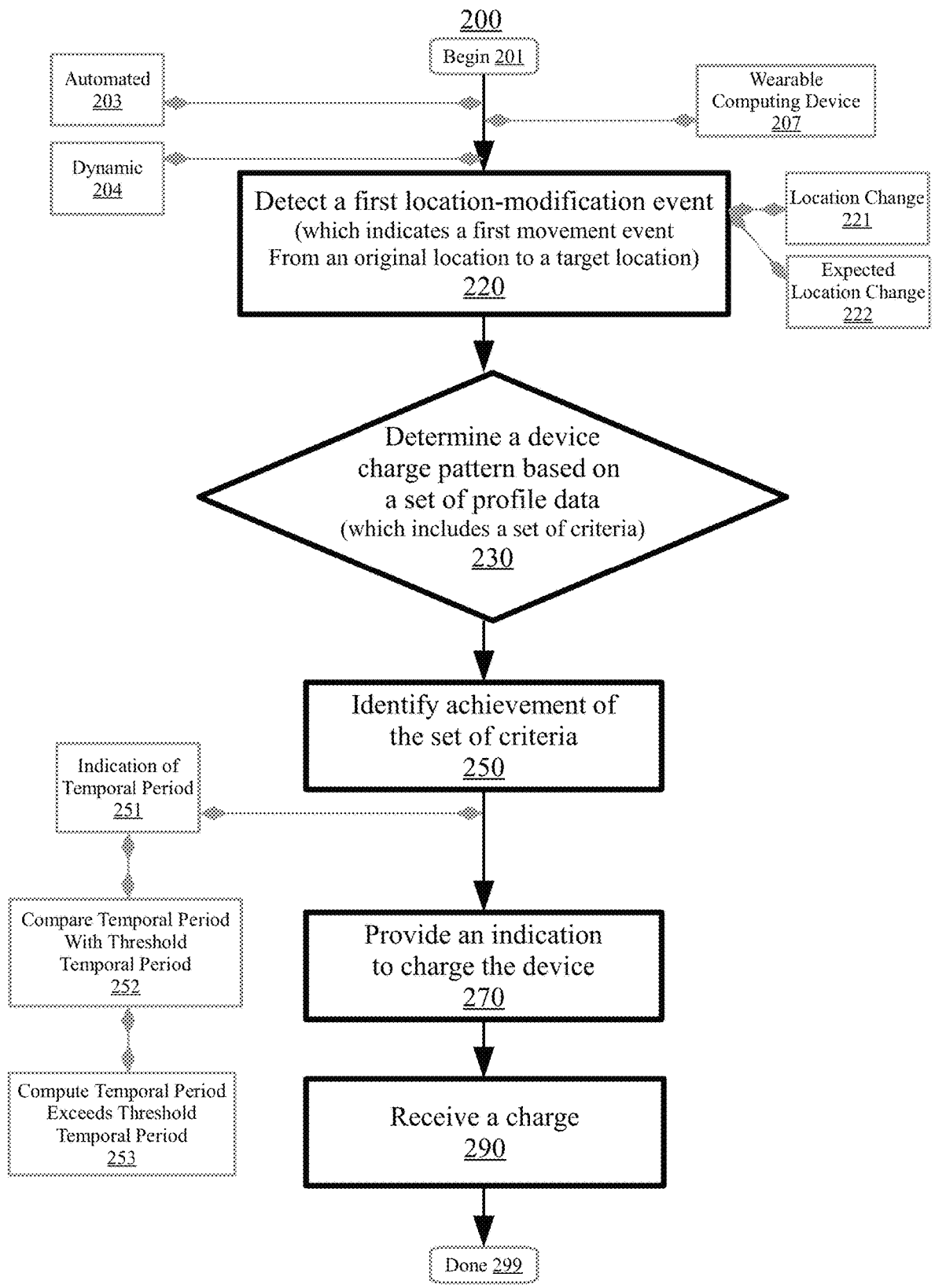
FIG. 2 is a flowchart illustrating a method for charge management of a device, according to embodiments.

FIG. 2 is a flowchart illustrating a method 200 for charge management of a device. The method 200 may begin at block 201. In embodiments, the device may include a wearable computing device at block 207. The device may include, incorporate, or otherwise comprise of a wearable computing device. The wearable computing device may include fitness-tracking bands, smartwatches, clothes, shoes, or other wearable technology. The wearable computing device may include both a location sensor (e.g., geo-location such as GPS, wireless internet access points, a user online check-in at a location, IP address) and a biometric sensor (e.g., thermometers for measuring body temperature, heart rate monitors, blood pressure monitors for cardiac data detection, pedometer for steps taken). Other possibilities for the wearable computing device are also contemplated.

In embodiments, the detecting, the determining, the identifying, the providing, the receiving, and the other steps described herein may each occur in an automated fashion without user intervention at block 203. In embodiments, the detecting, the determining, the identifying, the providing, the receiving, and other steps described herein may be carried out by an internal charge management module maintained in a persistent storage device of a local computing device. In certain embodiments, the detecting, the determining, the identifying, the providing, the receiving, and the other steps described herein may be carried about by an external charge management module hosted by a remote computing device or server. In this way, aspects of charge management may be performed using automated computer machinery without manual action. Other methods of performing the steps described herein are also possible. The detecting, the determining, the identifying, the providing, the receiving, and the other steps described herein may each occur in a dynamic fashion to streamline charge management of the device at block 204. The detecting, the determining, the identifying, the providing, the receiving, and the other steps described herein may be performed simultaneously (e.g., the set of profile data for the user may be captured in real-time while the user changes location) in order to streamline (e.g., facilitate, promote, enhance) charge management. Other methods of performing the steps described herein are also possible.

At block 220, a first location-modification event of the device may be detected by a charge management engine. Generally, detecting can include sensing, recognizing, discovering, identifying, ascertaining, receiving, or otherwise detecting the first location-modification event. A location may include a set of coordinates, a region, an area, a room, a place (e.g., stadium, school, work, coffee shop), or other location. The location-modification event may include the actual location change of a device from one place to another, the expected location change of a device from one place to another, or other location change of a device. An actual location change of a device may include a historical, current, or other occurrence that may indicate a change in location of the device. For example, a user wearing their device while changing their location from their home to a coffee shop, a user having worn their device having gone from work to the gym, or a user having worn their device during a cross-country flight. Other examples of an actual location change are also possible. An expected location change of a device may include an anticipated, predicted, or otherwise expected change in location of the device. For example, a user frequently or repeatedly wearing their device while changing their location from their home to a coffee shop, the device of a user knowing the college class schedule of a user, or a user booking a cross-country flight and adding their flight information to the device. Other examples of an expected location change are also possible. The first location-modification event of the device may indicate, specify, or otherwise signify a first movement event of the device from an original location (e.g., origin, source, first) to a target location (e.g., destination, end). The first movement event of the device may include an actual movement of the device, an expected movement of the device, or other movement of the device. An actual movement of the device may include a historical, current, or other occurrence that may indicate a movement of the device from the original location to a target location, such as a user wearing their device while driving home from work. An expected movement of the device may include an anticipated, predicted, or otherwise expected movement of the device from the original location to a target location, such as the user frequently wearing the device while driving home from work.

Consider the following example. A user may wear their smartwatch to their office every day. When the user is at their home, the smartwatch detects their home as the original location. When the user drives to their office, the smartwatch may detect this movement as a first location-modification event. The target location of the smartwatch may be the office building of the user. The actual movement of the user and their device may be the first movement event. The smartwatch may also detect an expected movement. For example, if the user wears their smartwatch to work every day, the smartwatch may anticipate this location-modification event. If the user leaves their home at 8:30 every day, the smartwatch may predict the movement event from home to the office to occur at 8:30. A user may also have moved from their office building to their gym. Based on this movement from one location to another, the smartwatch may decide to provide an indication to charge. Other methods of detecting a first location-modification event are also possible.

In embodiments, a location change may occur at block 221. The device may be detected to have moved from the original location to the target location. Detecting may include discerning, recognizing, or otherwise distinguishing an actual location change. The detection may correspond to detecting the first location-modification event of the device which indicates the first movement event of the device from the original location to the target location. The detection of the first location-modification event may correlate with, be consistent with, or otherwise coincide with the detection of the first movement event. The target location may include the current location. The target location may incorporate, encompass, or otherwise consist of the current location. The device may detect this first movement event once the user has arrived at their destination or target location.

Consider the following example. A user may wear their fitness band while driving from their gym to their apartment. The fitness band may detect the movement from the original location, in this case the gym of the user, to the target location, in this case the apartment of the user. The detection of movement may correspond to the location-modification event of the user traveling from their gym to their apartment. The fitness band of the user may detect the movement of the device once the user has arrived at the apartment, in which case the target location may also be the current location of the user and their device. Based on this detected movement from the original to target location, the fitness band may provide an indication to charge. Other methods of detecting an actual movement of a device are also possible.

In embodiments, an expected location change may occur at block 222. The device may be detected to have an expectation to move from the original location to the target location. Detecting may include discerning, recognizing, or otherwise distinguishing an expected location change of the device. The detection may correspond to detecting the first location-modification event of the device which indicates the first movement event of the device from the original location to the target location. The original location may include the current location. The original location may incorporate, encompass, or otherwise contain the current location. The device may detect the first movement event before the user arrives at their target location or while the device is still located at the original or starting location.

Consider the following example. A user may wear their fitness band while attending a yoga class every Thursday night at 7:30. On Thursday night at 7:30, the fitness band may detect the expected movement of the user and their device from their apartment to their yoga class. The detection of expected movement of the device may correspond to detecting the movement of the user and their device from the original to target location, in this case the movement of the user and their fitness band from their apartment to their yoga class. The fitness band of the user may detect the movement of the device while the user is still at their apartment, in which case the original location may also be the current location of user and their device. Other methods of detecting an expected movement of a device are also possible.

At block 230, a device charge pattern may be determined based on a set of profile data for a user. Generally, determining can include computing, formulating, identifying, resolving, selecting, calculating, or otherwise ascertaining the device charge pattern. The device charge pattern may include a pattern, design, model, or the like by which the device may be charged (e.g., a repeated model of when the device should be charged based on time, a recurring model of when the device should be charged based on location, a model for optimizing or managing battery life of a device). The device charge pattern may be based on, related to, or otherwise associated with a set of profile data for a user (e.g., biometric data, sleep schedules, calendar applications, user-provided input). The device charge pattern may include a set of criteria (e.g., location, time, appointment, current level of charge, expected amount of time before next available charge, amount of time since the last charge, expected rate at which the charge will occur, capacity to hold charge, number of applications open on the device, the expected number of applications that will be open on the device). The set of criteria may utilize a threshold, benchmark, or predetermined value or some combination thereof in order to determine the device charge pattern. The set of criteria may indicate to charge the device. The set of criteria may indicate, specify, signify, or otherwise designate to charge the device.

Consider the following example. A user of a smartwatch may use an electronic calendar application to store their schedule of events. The calendar application may indicate an hour-long meeting at 1:00 at work. The smartwatch may also currently have a low charge, (e.g., 10% charge), and the user may desire a certain level of charge (e.g., 95% charged) on their smartwatch in order to collect fitness data, such as number of steps taken or number of calories burned, from their walk home from work. The current 10% level of charge may be compared with a benchmark level of charge that indicates a low charge (e.g., 25%). The current 10% level of charge may be determined to be less than the 25% benchmark level of charge. The current 10% level of charge may be compared to a predetermined desired level of charge (e.g., 95%). The 10% level of charge may be determined to be less than the desired level of charge. Based on this set of profile data which includes a calendar appointment, a level of charge lower than the benchmark level of charge, and a desire for a higher level of charge, the smartwatch may determine that the device needs to be charged during the meeting of the user. The device charge pattern in this example may include charging the smartwatch from 1:00 until 2:00 in the afternoon. Other methods of determining a device charge pattern are also possible.

At block 250, achievement of the set of criteria may be identified by the charge management engine based on the device charge pattern. Generally, identifying can include determining, ascertaining, or otherwise resolving achievement of the set of criteria (e.g., arrival at a specific location, arrival of a specific time, occurrence of a specific appointment, achievement of a predetermined length of time since last charge, particular amount or type of applications currently open on the device). The identification of achievement of the set of criteria may be based on, related to, associated with, or otherwise connected to the device charge pattern. Achievement of the set of criteria may relate to the first location-modification event. Achievement of the set of criteria may relate to, connect with, or otherwise be associated with the first location-modification event. In certain embodiments, the achievement of the set of criteria may facilitate a continual or ongoing feed of data from the device to a remote server without interruption thereby enabling better data to be collected in a memory-constrained environment (e.g., a wearable device with limited memory to store all of the information it may be collecting).

Consider the following example. As described herein, the calendar application indicates a user meeting at work that will last ninety minutes. The smartwatch may currently have a low charge (e.g., 20%) and may need to have a certain desired level of charge (e.g., 75%) for the end of the day when the user plans to walk home whilst recording fitness data (e.g., number of steps taken, number of calories burned). The smartwatch may establish through the calendar application that the ninety-minute meeting of the user is about to begin. The smartwatch may also determine the achievement of a low charge (e.g., 20%) by comparing it to a certain benchmark level of low charge (e.g., 30%). The current level of charge may be determined to be lower than the benchmark level which indicates a low charge. The smartwatch may also identify, based on historical data and patterns, the desire for a higher charge (e.g., 90%) later on in the day. The smartwatch may determine the current charge of the device to be lower than a predetermined desired level of charge. The smartwatch may identify achievement of the set of criteria, in this case the start of a meeting, the achievement of a low charge in comparison to a benchmark value for low charge, and the desire for a higher level of charge in comparison to a predetermined desired level of charge. The set of criteria may indicate a need for the smartwatch to be charged during the meeting. Other methods of identifying achievement of the set of criteria may also occur.

In embodiments, indication of a temporal period may occur at block 251. A temporal period may be a window, length, period, extent, or duration of time (e.g., from 2:00 until 3:00, 45 minutes). It may be ascertained that the device charge pattern indicates a temporal period for which the device is expected to remain in a current location. Ascertaining may include deducing, discerning, or otherwise discovering that the device charge pattern indicates a temporal period for which the device is expected to remain at a current location (e.g., the original location for an expected location change, the target location for an actual location change). The charge pattern may indicate a temporal period based on calendar application data, historical or frequent user movement, or other types of data. The ascertaining that the device charge pattern indicates a temporal period may occur by the charge management engine.

Consider the following example. A user of a smartwatch may indicate in their calendar application that they have a dentist appointment at 9:00 in the morning. The user of the smartwatch may wake up at 8:00 in the morning. At this time, the smartwatch may be expected to remain at the current location, the home of the user, for another hour. The device charge pattern may indicate that the temporal period for which the device is expected to remain at the home of the user is 8:00 through 9:00 or one hour. The smartwatch may indicate the temporal period of 8:00 through 9:00 or one hour through the input of the user of the appointment into their calendar application. A user of a smartwatch may also be at a soccer match. The calendar application of the smartwatch may indicate that the user is at the match. The user may be expected to remain in their current location for the entirety of the ninety-minute match. The device charge pattern may indicate that the temporal period for which the device is expected to remain at the soccer match is ninety minutes. Other methods of ascertaining that the device pattern indicates a temporal period for which the device is expected to remain at a current location are also possible.

In embodiments, the temporal period for which the device is expected to remain in the current location may be compared with a threshold temporal period at block 252. The temporal period for which the device is expected to remain in the current location may be measured against, contrasted with, or otherwise differentiated from the threshold temporal period. The threshold temporal period may be an established, predetermined, or otherwise fixed value that may indicate a window, period, length, extent, or duration of time (e.g., one hour, between 7:00 and 9:00). The temporal period may be less than, greater than, or equal to the threshold temporal period.

Consider the following example. The smartwatch of a user may be configured such that the threshold temporal period is thirty minutes. The particular user as described herein may have indicated in their calendar application that they have a dentist appointment at 10:30 in the morning. The user may wake up and begin using their smartwatch at 8:30 in the morning. The temporal period during which the smartwatch is expected to remain at home is two hours. The temporal period of two hours may be compared to the threshold temporal period of one hour. However, on the other hand, the user may instead wake up and begin using their smartwatch at 9:45 in the morning. The temporal period during which the smartwatch is expected to remain at home is forty-five minutes. The temporal period of forty-five minutes may be compared to the threshold temporal period of one hour.

As another example, user may be a spectator at a soccer match. At the beginning of the match, the smartwatch may indicate that the user is expected to remain in their current location for a temporal period of ninety minutes. The temporal period may be compared to the threshold temporal period of one hour. However, on the other hand, the user may instead arrive at halftime. The smartwatch may indicate that the user is expected to remain in their current location for a temporal period of forty-five minutes. The temporal period may be compared to the threshold period of one hour. Other methods of comparing the temporal period with a threshold temporal period are also possible.

In embodiments, the temporal period may be computed to exceed the threshold temporal period at block 253. Computing may include calculating, determining, evaluating, or otherwise quantifying the temporal period to exceed the threshold temporal period. Exceeding may include being greater than or otherwise surpassing the threshold temporal period (e.g., thirty minute temporal period compared to ten minute threshold temporal period).

Consider the following example. As described herein, a particular user of a smartwatch has a dentist appointment at 11:00. The smartwatch of the user has a threshold temporal period of forty-five minutes. The user may wake up at 10:00 the morning of their appointment. The smartwatch may calculate that the user will remain at home for another hour, indicating a temporal period of one hour. The smartwatch may determine that the temporal period of one hour is greater than the threshold temporal period of forty-five minutes. The user may also wake up at 10:45 on the morning of their appointment. The smartwatch may calculate that the user is expected to remain at home for another fifteen minutes, indicating a temporal period of fifteen minutes. The smartwatch may determine that the temporal period of fifteen minutes does not exceed the threshold temporal period of forty-five minutes.

As another example, the user may arrive at a football game that is expected to last three hours. The user is expected to remain in their current location for a temporal period of three hours. The threshold temporal period of the user may be a period of one hour. The smartwatch may determine that the temporal period of three hours exceeds the threshold temporal period of one hour. However, on the other hand, the user may instead arrive at a football game at the start of the fourth quarter, which is expected to last twenty minutes. The smartwatch may determine that the temporal period of twenty minutes does not exceed the threshold temporal period of one hour. Other methods of computing that the temporal period exceeds the threshold temporal period are also possible.

At block 270, an indication to charge the device may be provided by the charge management engine. Generally, providing (e.g., to the user) can include presenting, displaying, issuing, dispensing, imparting, delivering, or otherwise producing an indication to charge. The indication to charge may include a message, reminder, pop-up, or other notification that may remind or request that the device be charged. The indication to charge may occur through email, text message, calendar event, or other indication. The indication to charge may be delivered through a visual reminder, an audio reminder (e.g., beeping sound, musical alert), vibration of the device, or the like. One or more of such indications or indication types may be utilized (e.g., a combination such as vibration and audio, a sequence such as visual subsequent to audio subsequent to vibration).

Consider the following example. A user may use their fitness band while attending a fitness training class. The user may wear this fitness band to track data such as number of steps taken, number of calories burned, heart rate, or other types of physical data. The device charge pattern may indicate that a charge value which exceeds a threshold value (e.g., 80%) is likely to be necessary in order to gather a complete set of data with respect to the class. The charge management engine may detect the expected movement of the user to the target location of the fitness class. The device charge pattern may indicate the requirement of an 80% level of charge for the duration of the fitness class. The device charge pattern may identify that the charge of the fitness band is not currently at 80% capacity. Based on the device charge pattern, in this case the requirement of an 80% level of charge for the duration of the class, and the achievement of the set of criteria, in this case, a fitness band that is not at an 80% level of charge, the fitness band may provide the user with an indication to charge the device while the user is still at their home. The fitness band may vibrate or beep at the start of certain temporal period before the fitness class in order to signal to the user a need for a charge. Other methods of providing an indication to charge the device may also occur.

At block 290, a charge may be received by the device. Generally, receiving can include collecting, obtaining, gaining, or otherwise acquiring a charge. Charging may include the storing, accumulating, or otherwise collecting of electrical energy in a battery or battery-operated device, such as a fitness band or smartwatch. The storing of electrical energy may include a full charge, a partial charge, or other level of capacitance. The charging of the device may occur wirelessly, non-wirelessly, with a portable charger, or through other methods.

Consider the following example. The user may require a 60% level of charge on their fitness band in order to track calories burned and heart rate during a fitness class. The current battery level (e.g., 45%) and requirement of a 60% level of charge may cause the fitness band to provide to the user an indication to charge the fitness band before the fitness class through a beeping sound or vibration. The user may plug their fitness band into a charging cord or use a portable charger to provide their fitness band with a full charge before the class. The gym at which the user attends class may also be equipped with a wireless charging system. The device may automatically charge wirelessly once the user reaches the target destination, the gym. Other methods of charging the device may also occur.

Method 200 concludes at block 299. As described herein, aspects of method 200 relate to using data of a user (e.g., location, calendar appointments, sleep schedules) in order to manage the charge of a device. Aspects of method 200 may provide performance or efficiency benefits for improving the charge of the wearable device of a user. Aspects may save resources such as bandwidth, disk, processing, or memory. As an example, the optimization of charging a device (e.g., while the device is connected to a charger, while the device is not being used, while the device is not collecting data) may allow the device to more quickly process user data in the future.

Figure 3:
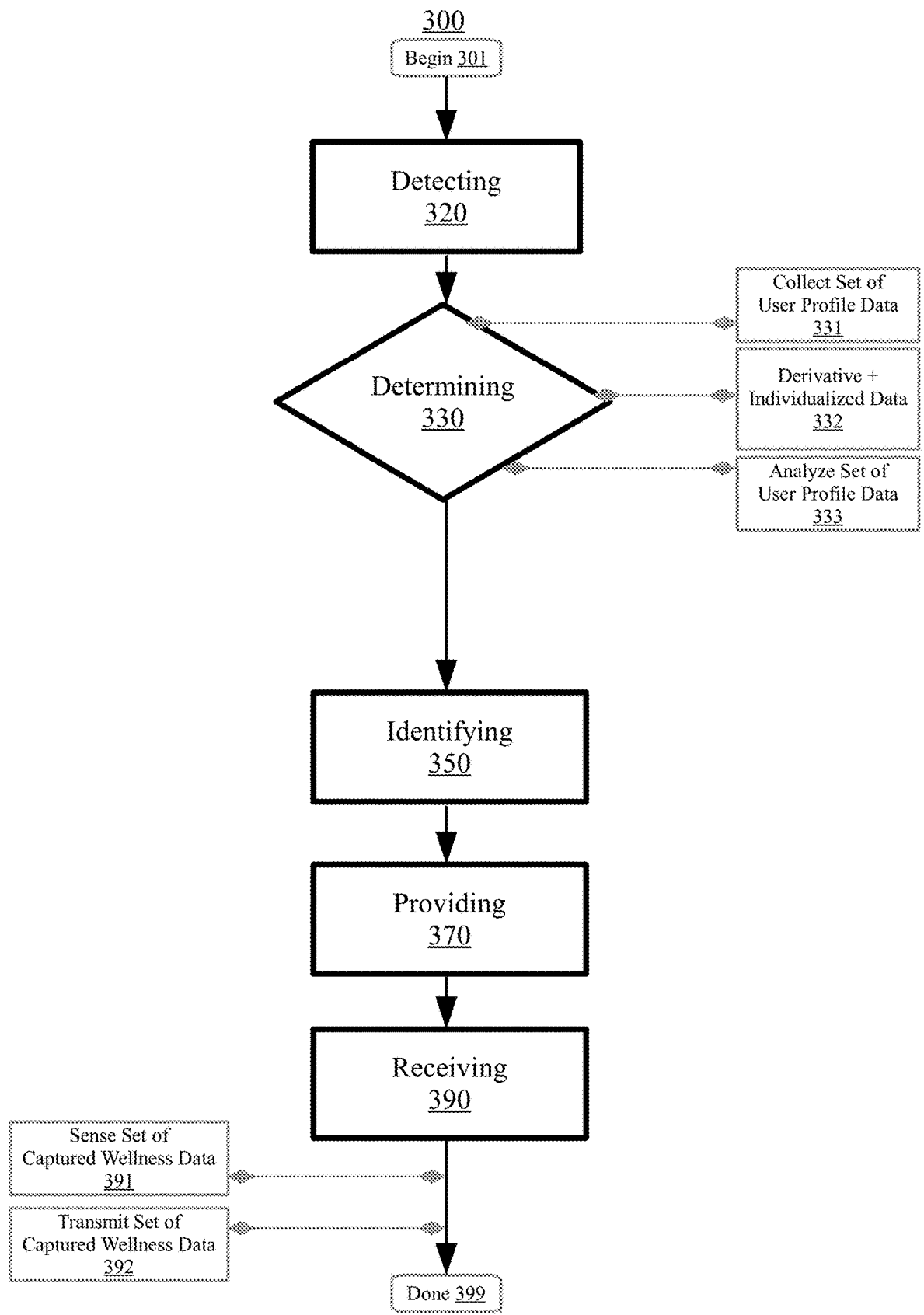
FIG. 3 is a flowchart illustrating a method for charge management of a device, according to embodiments.

FIG. 3 is a flowchart illustrating a method 300 for charge management of a device, according to embodiments. Aspects of method 300 may be similar or the same as aspects of method 200, and aspects may be utilized interchangeably with one or more methodologies described herein. The method 300 may begin at block 301. At block 320, a first location-modification event of the device may be detected by a charge management engine. The first location-modification event of the device may indicate a first movement event of the device from an original location to a target location. At block 330, a device charge pattern may be determined based on a set of profile data for a user. The device charge pattern may include a set of criteria. The set of criteria may indicate to charge the device.

In embodiments, the set of profile data for the user may be collected by the charge management engine at block 331. The set of profile data may be a set of information about a specific user that may include personal, historical, biometric, or other types of data. The set of profile data for the user may be gathered, accumulated, or otherwise assembled by the charge management engine. The set of profile data for the user may include a set of temporal data (e.g., amount of time between the workday of a user and the fitness class of a user, time of an appointment of the user). The set of profile data for the user may include a set of user biometric data (e.g., facial expression, voice recognition, keystroke recognition). The set of profile data for the user may include a set of user age data (e.g., age of the user, birthdate of the user, estimated age of the user based on physical health data). The set of profile data for the user may include a set of user height data (e.g., height of the user, growth of the user). The set of profile data for the user may include a set of user weight data (e.g., weight of the user, weight gain of the user, weight loss of the user). The set of profile data for the user may include a set of user heart rate data (e.g., baseline heart rate of the user, baseline heart rate of the user during physical activity, change in heart rate data, abnormality in heart rate data). The set of profile data for the user may include a set of user blood pressure data (e.g., baseline blood pressure of the user, data regarding blood pressure problems of the user, change in blood pressure data, abnormalities in blood pressure data). The set of profile data for the user may include a set of user physical activity data (e.g., a calendar of fitness classes the user attends, preferred physical activities, times of day when the user is frequently physically active, pedometer data, number of miles traveled). The set of profile data for the user may include a set of user sleep data (e.g., desired number of hours of sleep, actual number of hours of sleep, times at which the user is frequently asleep). The set of profile data for the user may include a set of user calendar data (e.g., appointments, meetings, holidays and special occasions, classes). The set of profile data for the user may include a set of user-provided input data (e.g., the user prefers to not take their device to work, the user prefers to have their device in the car with them regardless of device notifications, the user specifies preferred physical activities).

Consider the following example. A set of profile data may be collected by the charge management engine for the user of a fitness band who is trying to get in better shape. The user may spend a time period of two hours at their apartment between work and a certain fitness class. The user may be a twenty-year-old college student. The user may be six feet tall and one hundred and fifty pounds. The user may have a baseline heart rate of 80 beats per minute. The user may have a baseline blood pressure of 100 over 70. The user may frequently lift weights at the university gym, and indicate a preference for jogging around campus. The user may get, on average, six hours of sleep per night, normally between the hours of midnight and 6:00 in the morning. The user may use their calendar application as a reminder of weekly spin classes that they attend. The fitness band may indicate to the user to charge the device in the two hour time period between work and their fitness class. The user may not want to charge their device during this time but instead may want to charge their device during lunch. The user may ignore the notification to charge. The fitness band may detect the repeated ignoring of the notification and collect this as a user preference. The information may be combined to create a set of profile data for the user of the fitness band. Other methods of collecting a set of profile data may also occur.

In embodiments, the set of profile data for the user may be selected at block 332. Selecting may include choosing or otherwise indicating the set of profile data for the user. The set of profile data for the user may include a set of derivative data of a group of like users (e.g., individuals of similar wellness, physical characteristics, demographics, occupations). The derivative data may be originating from, based on, or influenced by information regarding the group of like users. Data pertaining to a group of like users may be similar to data of the user. The set of profile data for the user may include a set of individualized data of the user (e.g., user-specific, historical data, frequent locations and activities). The set of individualized data may be tailored to, specific to, or otherwise customized for the individual user. Data which is specific to the user may build a more user-specific set of profile data.

Consider the following example. A user of a smartwatch has recently joined the Marines. The smartwatch may use a set of derivative data in order to determine when the device may need to be charged. A group of like users may include other Marines, particularly ones who may currently be on the same ship as the user. The derivative data may include the specific schedule that the fellow Marines have to adhere to. For example, these users may be allowed a period of free time at the same time after dinner every evening. These users may frequently charge their devices during this period of free time. The new Marine may not be able to determine on their own when their smartwatch needs to be charged or when they will have time to charge the smartwatch. Based on the data from other users who are on the same ship, the user may be provided with an indication to charge their smartwatch at the end of dinner or at the beginning of their free time. After the user has been a Marine for a longer amount of time, the set of profile data may become more user-specific based on the individual schedule, habits, and needs of the user. The user may prefer to charge their smartwatch while eating breakfast in order to track their fitness activity throughout their training or missions. Based on the frequent charging of the smartwatch during breakfast instead of after dinner, the device may provide the user with an indication to charge just before or at the beginning of breakfast. Other methods of selecting the set of profile data from derivative and individualized data may also be possible.

In embodiments, the set of profile data for the user may be analyzed at block 333. For example, analyzing can include extracting (e.g., creating a derivation), examining (e.g., performing an inspection), scanning (e.g., reviewing a sample), evaluating (e.g., generating an appraisal), dissecting (e.g., scrutinizing attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information or patterns from a data set and transform or translate it into an understandable structure (e.g., a data report which can be provided/furnished) for further use. The set of profile data for the user may be analyzed using a machine-learning technique. The machine-learning technique may be a method of collecting artificial intelligence that provides the device with the ability to learn, detect patterns, make changes or predictions, or other actions without the device being explicitly programmed to do so. The set of profile data for the user may determine the device charge pattern. Determining may include concluding, formulating, calculating, or otherwise ascertaining the device charge pattern (e.g., time, location, level of charge).

Consider the following example. The profile data of a user may indicate that they are a college student with a particular class schedule (e.g., every Monday and Wednesday from 9:00 until noon). The user may wear the device to class every Monday and Wednesday from 9:00 until noon. The device may detect the user going to class on these days for this length of time. The machine-learning technique may be used to establish this pattern. The device charge pattern may indicate to charge the device Monday and Wednesday, starting at 9:00. Other methods of analyzing the set of profile data are also possible.

At block 350, achievement of the set of criteria may be identified by the charge management engine based on the device charge pattern. Achievement of the set of criteria may relate to the first location-modification event. At block 370, an indication to charge the device may be provided by the charge management engine. At block 390, a charge may be received by the device.

In embodiments, a set of captured wellness data on the device may be sensed at block 391. The set of captured wellness data may be biometric, temporal, calendar, or other types of data as described herein which relate to wellness (e.g., heart rate, appointment, sleep schedule). Sensing may include detecting, identifying, perceiving, observing, or otherwise discovering the set of captured wellness data. The set of captured wellness data may be sensed by the charge management engine.

Consider the following example. A user may be an airman enlisted in the Air Force. The airman may use a computing device attached to their uniform. The device may sense a set of captured wellness data related to the training and mission schedule of the airman. For example, the device may calculate a baseline heart rate for the airman of 60 beats per minute. The device may detect that the airman goes on a run every morning from 7:00 until 8:00. The device may sense this due to a rapid change in movement (e.g., six miles in one hour) and an elevated heart rate (e.g., 100 beats per minute) during this time. The device may detect that the airman sleeps every night from 11:00 until 5:00. The device may sense this due to a lower heart rate (e.g., 50 beats per minute) and no movement during this time. The heart rate, frequent activity, and sleep schedule of the airman, along with other information, may comprise the set of captured wellness data for this particular user. Other methods of sensing the set of captured wellness data may also occur.

In embodiments, the set of captured wellness data may be transmitted to a remote server at block 392. Transmitting may include sending, transporting, relaying, transferring, or otherwise passing on the set of captured wellness data. A remote server may store information related to the user of the device, such as the set of captured wellness data. The remote server may be a computer, a cloud environment, a data center, a data warehouse, or another type of computing apparatus which may be in a different physical location from the device. The set of captured wellness data may be transmitted by the charge management engine to a remote server. The set of captured wellness data may be transmitted when the charge is received by the device. The transmission of captured wellness data once the charge is received enables the device to maintain charge.

Consider the following example. The user of a fitness band may be the instructor of a fitness class. The device of the fitness instructor may establish a set of captured wellness data for the user, including a frequent location of the instructor at their gym between 6:00 and 8:00 every weekday in order to teach their class. The gym at which the instructor teaches their class may have a wireless charging system that allows the fitness band to charge automatically whenever the instructor is at the gym. The fitness band may charge automatically between 6:00 and 8:00 every weekday as soon as the instructor arrives. When this charge is received by the fitness band, the set of captured wellness data (e.g., 80 beats per minute heart rate, 300 calories burned) may be transmitted to a remote server, such as the laptop computer or cloud storage environment of the instructor. The laptop computer of the instructor may be at their apartment instead of the gym. Since the fitness band is connected to the wireless charging system at the gym, the fitness band is simultaneously charging while transmitting information. The charge of the fitness band may not drain as quickly as it would if the device were not connected to a charging system. Other methods of transmitting captured wellness data to a remote server may also occur. Method 300 concludes at block 399. Aspects of method 300 may have various performance or efficiency benefits as described herein.

Figure 4:
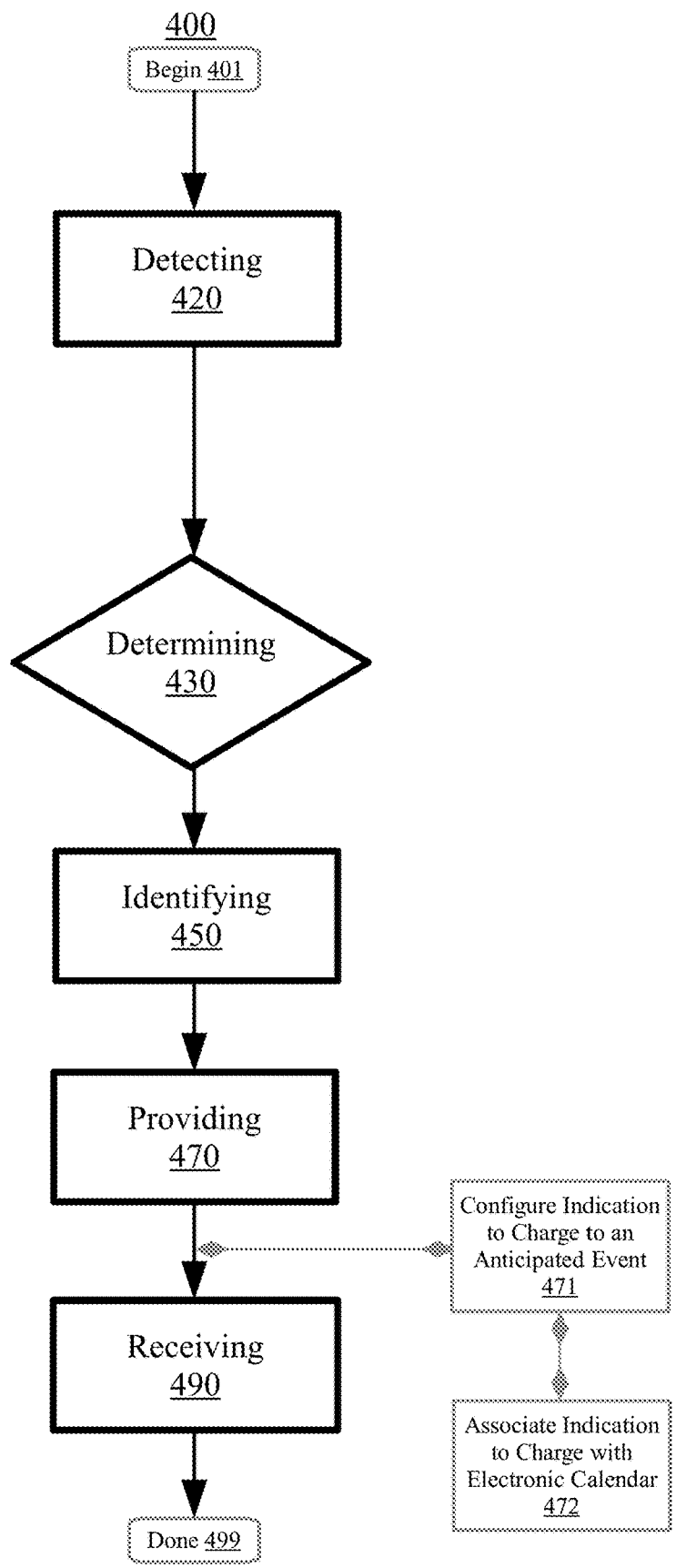
FIG. 4 is a flowchart illustrating a method for charge management of a device, according to embodiments.

FIG. 4 is a flowchart illustrating a method 400 for charge management of a device, according to embodiments. Aspects of method 400 may be similar or the same as aspects of method 200/300, and aspects may be utilized interchangeably with one or more methodologies described herein. The method 400 may begin at block 401. At block 420, a first location-modification event of the device may be detected by a charge management engine. The first location-modification event of the device may indicate a first movement event of the device from an original location to a target location. At block 430, a device charge pattern may be determined based on a set of profile data for a user. The device charge pattern may include a set of criteria. The set of criteria may indicate to charge the device. At block 450, achievement of the set of criteria may be identified by the charge management engine based on the device charge pattern. Achievement of the set of criteria may relate to the first location-modification event. At block 470, an indication to charge the device may be provided by the charge management engine.

In embodiments, the indication to charge the device may be configured at block 471. The indication to charge may include an audio, visual, or sensed notification. The indication to charge the device may be configured to correspond to an anticipated event. The indication to charge the device may be constructed, composed, designed, or otherwise arranged to correspond to an anticipated event (e.g., expected/upcoming activity). The indication to charge the device may be configured to coincide with, correlate with, or otherwise be consistent with an anticipated event (e.g., when driving between appointments, during a specific meeting, when at a particular location).

Consider the following example. A user of a smartwatch may be a college professor who teaches a class between 6:00 and 7:30 in the evening on Tuesdays before typically biking thirty minutes home. The calendar application of this smartwatch may indicate that the professor will be teaching between 6:00 and 7:30 every Tuesday, and detect that the user moves from campus to their home afterwards. The professor may want to use their smartwatch in order to record data from their bike ride (e.g., calories burned). The smartwatch may anticipate that the professor will spend thirty minutes biking after spending ninety minutes with minimal movement while teaching. The smartwatch may configure an indication to charge the device during the class, between 6:00 and 7:30. The smartwatch may configure the indication to charge due to correlate with the bike ride of the professor and the desire of a higher level of charge (e.g., 75%) after the class. The professor may be provided with an indication to charge during their class. Other methods of configuring an indication to charge are also possible.

In embodiments, the indication to charge the device may be affixed at block 472. The indication to charge may be attached to, connected to, in association with, or otherwise in accordance with an electronic calendar event (e.g., an appointment, a party, a meeting, a fitness class) such as by including the notification to charge in the body of the meeting notice, a reminder label of the electronic calendar event, a task linked to the electronic calendar event, or the like.

Consider the following example. The calendar application of a user of a fitness band may indicate a weekly meeting of the user between 4:00 and 5:00. The user may frequently go to the gym after this meeting and desire at least an 80% charge while working out. The charge level of the fitness band may frequently be at less than 80% (e.g., 60%) at the start of the weekly meeting, in this case, 4:00. The user may receive an indication to charge at the start of this meeting. The indication to charge may be affixed to the calendar event of the weekly meeting (e.g., in the subject line). The user may receive the indication to charge their fitness band at the beginning of every weekly meeting. Other methods of affixing an indication to charge with an electronic calendar event are also possible. At block 490, a charge may be received by the device. Method 400 concludes at block 499. Aspects of method 400 may have various performance or efficiency benefits as described herein.

Figure 5:
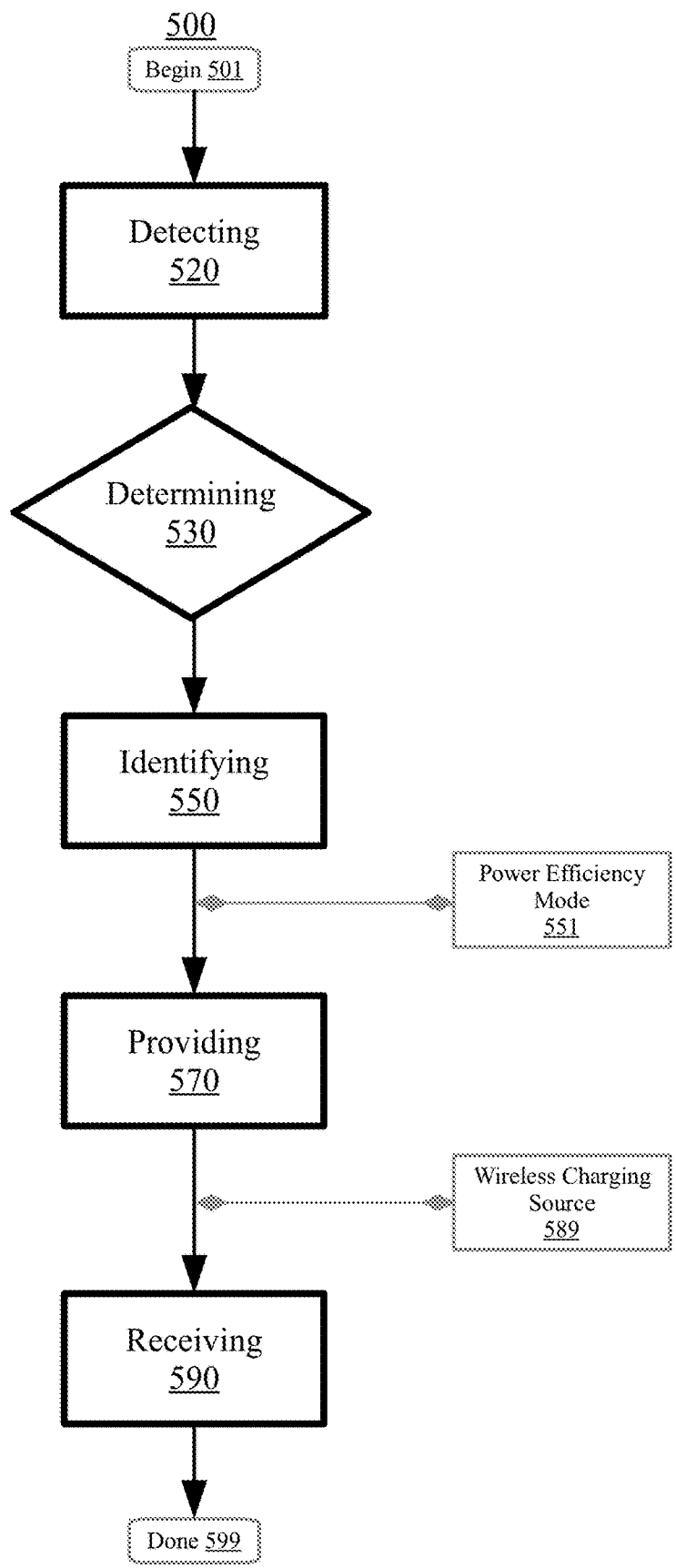
FIG. 5 is a flowchart illustrating a method for charge management of a device, according to embodiments.

FIG. 5 is a flowchart illustrating a method 500 for charge management of a device, according to embodiments. Aspects of method 500 may be similar or the same as aspects of method 200/300/400, and aspects may be utilized interchangeably with one or more methodologies described herein. The method 500 may begin at block 501. At block 520, a first location-modification event of the device may be detected by a charge management engine. The first location-modification event of the device may indicate a first movement event of the device from an original location to a target location. At block 530, a device charge pattern may be determined based on a set of profile data for a user. The device charge pattern may include a set of criteria. The set of criteria may indicate to charge the device. At block 550, achievement of the set of criteria may be identified by the charge management engine based on the device charge pattern. Achievement of the set of criteria may relate to the first location-modification event.

In embodiments, a power efficiency mode may be initiated for the device at block 551. The power efficiency mode may include a low-power mode, a power-save mode, or other method designed to preserve battery of a device. The power efficiency mode may be proposed, introduced, or otherwise initiated for the device. A power efficiency mode for the device may be initiated in response to identifying achievement of the set of criteria. The power efficiency mode may be initiated in connection to, upon occurrence of, or once accomplishing the achievement of the set of criteria (e.g., a specific time, arrival at home, a certain level of battery).

Consider the following example. The calendar application of a user may indicate that the user will be spending six hours at the beach. The user may not be able to charge their device while at the beach. The device may have an established set of criteria, which may include the initiation of a power-efficiency mode if the amount of time during which the user will not be home exceeds four hours. The calendar application indicates that the user will be away from home for at least six hours. The device may compare the six-hour calendar event with the threshold period of four hours and determine that the length of time of the calendar event exceeds the length of time of the threshold period. In embodiments, the device may initiate a power efficiency mode. The device may also have a predetermined level of charge (e.g., 20%) which indicates a level of low charge. The achievement of the predetermined 20% level of charge may initiate a power efficiency mode. Other methods of initiating a power efficiency mode are also possible.

At block 570, an indication to charge the device may be provided by the charge management engine. In embodiments, the device may be connected to a wireless charging source at block 589. Connecting may include linking, joining, coupling, or otherwise attaching to a wireless charging source (e.g., inductive charging source, charging distribution center, wireless car charger). The device may be connected to a wireless charging source by the charge management engine. The connection may occur in an automated fashion. The connection may be carried out by an internal wireless charging management module maintained in a persistent storage device of a local wearable computing device (e.g., fitness band, smartwatch).

Consider the following example. The user of a device may spend forty minutes driving to work every day. The user may also have a wireless charger installed in their car. The user may not need their device to record any data during their commute. The device of the user may automatically connect to the wireless car charger in order to charge the device while the user is driving. The user may desire a predetermined 90% level of charge for the start of their workday. When the user gets in their car in the morning, the device may only have a charge of 40%. The device may compare the 40% level of charge with the established 90% level benchmark and may determine the current level of charge to be less than the desired level of charge. Based on the comparison, the device may automatically connect to the wireless car charger during the commute of the user. Other examples of connecting to a wireless charging source are also possible. At block 590, a charge may be received by the device. Method 500 concludes at block 599. Aspects of method 500 may have various performance or efficiency benefits as described herein.

Consider the following example. The user of a fitness band may be a college student attempting to stay healthy and lose weight while living on-campus. The fitness band may detect that the student has changed location from their dorm room to a classroom building. The fitness band may determine that the wearable device should be charged while the student is in class since the student is unlikely to move very much and therefore may not have fitness and health data to record. The fitness band may identify that the student has arrived in their classroom. They may also identify that the student will remain in their classroom for one hour. The hour-long length of time may be compared with a predetermined temporal period (e.g., thirty minutes). Since the one-hour length of time during which the student will be in class exceeds the temporal period of thirty minutes, the fitness band may provide the student with an indication to charge the device.

The fitness band of the college student may collect of set of user profile data. This may include the typical heart-rate of the student, their current weight and weight-loss goals, their typical blood pressure, their sleep schedule, their calendar data, and other data that the student inputs on their own, such as individual preferences. This profile data may also include data derived from a group of like users, such as other college students or people with similar fitness patterns and goals. The profile data may also include a set of individualized data specific to the user based on their history and frequent patterns. The fitness band may sense this set of captured wellness data and transmit the data to the laptop or cloud environment of the user while the device is being charged. The indication for the student to charge their fitness band may be affixed to an anticipated event. An example of this is affixing the indication to charge the fitness band to when the student is anticipated or expected to be in class. The indication to charge the device may also be associated with the electronic calendar of the student. For example, the student may indicate a study group in their electronic calendar between 7:00 and 9:00. Since the student is unlikely to move during a study group, the indication to charge the fitness band may be associated with this event. Other examples of the method are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer program product for charge management of a device for recording personal health data for a user, the computer program product comprising:
   one or more computer-readable storage devices and program instructions stored on at least one of the one or more tangible storage devices, the program instructions comprising:
   program instructions to detect, by a charge management engine, a first location-modification event of the device which indicates a first movement event of the device from an original location to a target location;
   program instructions to determine, based on a set of profile data for the user, a device charge pattern which includes a set of criteria that indicates to charge the device, wherein the set of criteria comprises a location, a time, an appointment, a current level of charge, an expected amount of time before next available charge, an amount of time since the last charge, an expected rate at which the charge will occur, a capacity to hold charge, a number of applications open on the device, and an expected number of applications that will be open on the device;
   program instructions to ascertain, by the charge management engine, that the device charge pattern indicates a temporal period for which the device is expected to remain in a current location and charging the device during the temporal period will not interrupt the collection of personal health data for the user;
   program instructions to detect, corresponding to detecting the first location-modification event of the device which indicates the first movement event of the device from the original location to the target location, that the device has moved from the original location to the target location, wherein the target location includes the current location;
   program instructions to identify, by the charge management engine based on the device charge pattern, achievement of the set of criteria which relates to the first location-modification event; and
   program instructions to provide, by the charge management engine, an indication to the user to charge the device based on the achievement of the set of criteria.

2. The computer program product of claim 1, further comprising:

program instructions to compare, with a threshold temporal period, the temporal period for which the device is expected to remain in the current location; and program instructions to compute that the temporal period exceeds the threshold temporal period.

3. The computer program product of claim 1, further comprising:

program instructions to detect, corresponding to detecting the first location-modification event of the device which indicates the first movement event of the device from the original location to the target location, that the device is expected to move from the original location to the target location, wherein the original location includes the current location.

4. The computer program product of claim 1, wherein the device includes a wearable computing device that includes both a location sensor and a biometric sensor.

5. The computer program product of claim 1, further comprising:

program instructions to collect, by the charge management engine, the set of profile data for the user, wherein the set of profile data for the user comprises:
a set of temporal data,
a set of user biometric data,
a set of user age data,
a set of user height data,
a set of user weight data,
a set of user heart rate data,
a set of user blood pressure data,
a set of user physical activity data,
a set of user sleep data,
a set of user calendar data, or
a set of user-provided input data.

6. The computer program product of claim 1, further comprising:

program instructions to configure the indication to charge the device to correspond to an anticipated event.

7. The computer program product of claim 1, further comprising:

program instructions to affix the indication to charge the device in association with an electronic calendar event.

8. The computer program product of claim 1, wherein the set of profile data for the user comprises:
a set of derivative data of a group of like users which is similar to the user, and
a set of individualized data of the user based on a history of the user.

9. The computer program product of claim 1, further comprising:

program instructions to sense, by the charge management engine, a set of captured wellness data on the device; and program instructions to transmit, by the charge management engine to a remote server, the set of captured wellness data when the charge is received by the device.

10. The computer program product of claim 1, further comprising:

program instructions to initiate, in response to identifying achievement of the set of criteria, a power efficiency mode for the device.

11. The computer program product of claim 1, further comprising:

program instructions to connect, by the charge management engine in an automated fashion, the device to a wireless charging source.

12. The computer program product of claim 1, wherein the indication to charge the device is provided to the user upon arriving at the current location.

13. A computer program product for charge management of a wearable device used for recording personal health data for a user, the computer program product comprising:

one or more computer-readable storage devices and program instructions stored on at least one of the one or more tangible storage devices, the program instructions comprising:

program instructions to determine a set of profile data for the user, the set of profile data for the user comprising a set of temporal data, a set of user biometric data, a set of user age data, a set of user height data, a set of user weight data, a set of user heart rate data, a set of user blood pressure data, a set of user physical activity data, a set of user sleep data, a set of user calendar data, and set of user-provided input data;

program instructions to determine charging criteria for the wearable device using the set of profile data for the user, wherein the charging criteria comprises a location, a time, an appointment, a current level of charge, an expected amount of time before next available charge, an amount of time since the last charge, an expected rate at which the charge will occur, a capacity to hold charge, a number of applications open on the wearable device, and an expected number of applications that will be open on the wearable device;

program instructions to detect a first location-modification event of the wearable device which indicates movement event of the wearable device from an original location to a target location;

program instructions to determine a charging opportunity based on the detection of the location-modification event, the set of profile data for the user, and the charging criteria, wherein the charging opportunity comprises a charging location and a temporal period during which recording of the user's personal health data by the wearable device will not be interrupted; and program instructions to notify the user of the charging opportunity.

14. The computer program product of claim 13, wherein the user is notified of the charging opportunity upon detection of the location-modification event.

15. The computer program product of claim 13, wherein the set of profile data for the user comprises:
a set of derivative data of a group of like users which is similar to the user, and
a set of individualized data of the user based on a history of the user.

16. A computer program product for charge management of a wearable device used for recording wellness data for a user, the computer program product comprising:

one or more computer-readable storage devices and program instructions stored on at least one of the one or more tangible storage devices, the program instructions comprising:

program instructions to determine a set of profile data for the user, the set of profile data for the user comprising a set of temporal data, a set of user biometric data, a set of user age data, a set of user height data, a set of user weight data, a set of user heart rate data, a set of user blood pressure data, a set of user physical activity data, a set of user sleep data, a set of user calendar data, and set of user-provided input data;

program instructions to distinguish relevant wellness data from non-relevant wellness data based on the set of profile data for the user, wherein relevant wellness data is recorded by the wearable device during periods of time in which the user is active and non-relevant wellness data is recorded by the wearable device during periods of time in which the user is inactive and;

program instructions to determine charging criteria for the wearable device using the set of profile data for the user, wherein the charging criteria comprises a location, a time, an appointment, a current level of charge, an expected amount of time before next available charge, an amount of time since the last charge, an expected rate at which the charge will occur, a capacity to hold charge, a number of applications open on the wearable device, and an expected number of applications that will be open on the wearable device;

program instructions to determine a charging opportunity based on the set of profile data for the user, and the charging criteria, wherein the charging opportunity comprises a charging location and a temporal period during which non-relevant wellness data will be recorded for the user thereby preventing interruptions in the collection of relevant wellness data for the user; and program instructions to notify the user of the charging opportunity.

17. The computer program product of claim 16, wherein the program instructions to determine the charging opportunity is further based on program instructions to determine a charge level of the wearable device necessary to record wellness data during a future period of time in which the user will be active is greater than a current battery level of the wearable device.

18. The computer program product of claim 16, wherein the set of profile data for the user comprises:
   a set of derivative data of a group of like users which is similar to the user, and
   a set of individualized data of the user based on a history of the user.

* * * * *